(12) United States Patent
Stepinski

(10) Patent No.: US 11,203,544 B1
(45) Date of Patent: *Dec. 21, 2021

(54) ZERO LIQUID DISCHARGE RECYCLING SYSTEM FOR PCB FAB, GENERAL METAL FINISHING, AND CHEMICAL MILLING

(71) Applicant: GreenSource Fabrication LLC, Chester, CT (US)

(72) Inventor: Alexander Slavomir Stepinski, Saunderstown, RI (US)

(73) Assignee: GreenSource Fabrication LLC, Chester, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/245,333

(22) Filed: Apr. 30, 2021

Related U.S. Application Data

(63) Continuation of application No. 17/120,124, filed on Dec. 12, 2020, now Pat. No. 11,021,384.

(51) Int. Cl.
*C02F 9/00* (2006.01)
*B01D 21/26* (2006.01)
(Continued)

(52) U.S. Cl.
CPC .............. *C02F 9/00* (2013.01); *B01D 21/262* (2013.01); *B01D 29/11* (2013.01); *B01D 61/022* (2013.01); *B01D 61/025* (2013.01); *B01D 61/027* (2013.01); *B01D 2311/06* (2013.01); *B01D 2311/08* (2013.01); *B01D 2311/25* (2013.01); *B01D 2311/2619* (2013.01); *B01D 2311/2623* (2013.01); *B01D 2311/2626* (2013.01); *B01D 2311/2634* (2013.01); *B01D 2311/2642* (2013.01); *B01D 2311/2649* (2013.01); *B01D 2311/2669* (2013.01); *B01D 2311/2684* (2013.01); *C02F 1/001* (2013.01); *C02F 1/045* (2013.01); *C02F 1/283* (2013.01); *C02F 1/325* (2013.01); *C02F 1/42* (2013.01); *C02F 1/441* (2013.01); *C02F 1/442* (2013.01); *C02F 1/4695* (2013.01); *C02F 1/52* (2013.01); *C02F 1/66* (2013.01); *C02F 1/78* (2013.01); *C02F 11/125* (2013.01); *C02F 11/13* (2019.01); *C02F 11/14* (2013.01); *C02F 2001/425* (2013.01);
(Continued)

(58) Field of Classification Search
CPC ................ B01D 61/025; B01D 61/027; B01D 2311/2634; C02F 9/00; C02F 2001/5218
See application file for complete search history.

(56) References Cited

U.S. PATENT DOCUMENTS

| 8,486,275 B2 | 7/2013 | Wolf |
| 10,550,020 B2 | 2/2020 | Sitkiewitz |

(Continued)

FOREIGN PATENT DOCUMENTS

| CN | 107673560 A | 2/2018 |
| CN | 109912118 A | 6/2019 |

(Continued)

*Primary Examiner* — Bradley R Spies
(74) *Attorney, Agent, or Firm* — McGurk Group LLC

(57) ABSTRACT

A method, system and composition is described for treating waste generated from manufacturing operations including at least one of Printed Circuit Boards Fabrication (PCB FAB), General Metal Finishing (GMF), semiconductors manufacturing, chemical milling, and Physical Vapour Deposition (PVD). The method, system and composition are used to create zero liquid discharge recycling.

15 Claims, 1 Drawing Sheet

(51) Int. Cl.
  *B01D 29/11* (2006.01)
  *B01D 61/02* (2006.01)
  *C02F 11/14* (2019.01)
  *C02F 101/12* (2006.01)
  *C02F 1/42* (2006.01)
  *C02F 11/125* (2019.01)
  *C02F 1/66* (2006.01)
  *C02F 1/00* (2006.01)
  *C02F 101/30* (2006.01)
  *C02F 103/16* (2006.01)
  *C02F 1/52* (2006.01)
  *C02F 1/28* (2006.01)
  *C02F 103/34* (2006.01)
  *C02F 103/04* (2006.01)
  *C02F 1/44* (2006.01)
  *C02F 1/78* (2006.01)
  *C02F 1/04* (2006.01)
  *C02F 1/469* (2006.01)
  *C02F 1/32* (2006.01)
  *C02F 11/13* (2019.01)

(52) U.S. Cl.
  CPC .. *C02F 2001/5218* (2013.01); *C02F 2101/12* (2013.01); *C02F 2101/30* (2013.01); *C02F 2103/04* (2013.01); *C02F 2103/16* (2013.01); *C02F 2103/346* (2013.01); *C02F 2209/05* (2013.01); *C02F 2209/20* (2013.01); *C02F 2301/046* (2013.01); *C02F 2301/08* (2013.01)

(56) References Cited

U.S. PATENT DOCUMENTS

| | | |
|---|---|---|
| 2011/0180479 A1 | 7/2011 | Cordatos |
| 2019/0127253 A1 | 5/2019 | Thomas |
| 2019/0256987 A1 | 8/2019 | Snydacker et al. |
| 2020/0048128 A1 | 2/2020 | Bjorklund |

FOREIGN PATENT DOCUMENTS

| | | |
|---|---|---|
| CN | 111533315 A | 8/2020 |
| WO | 2005054746 A2 | 6/2005 |
| WO | 2020179594 A1 | 9/2020 |

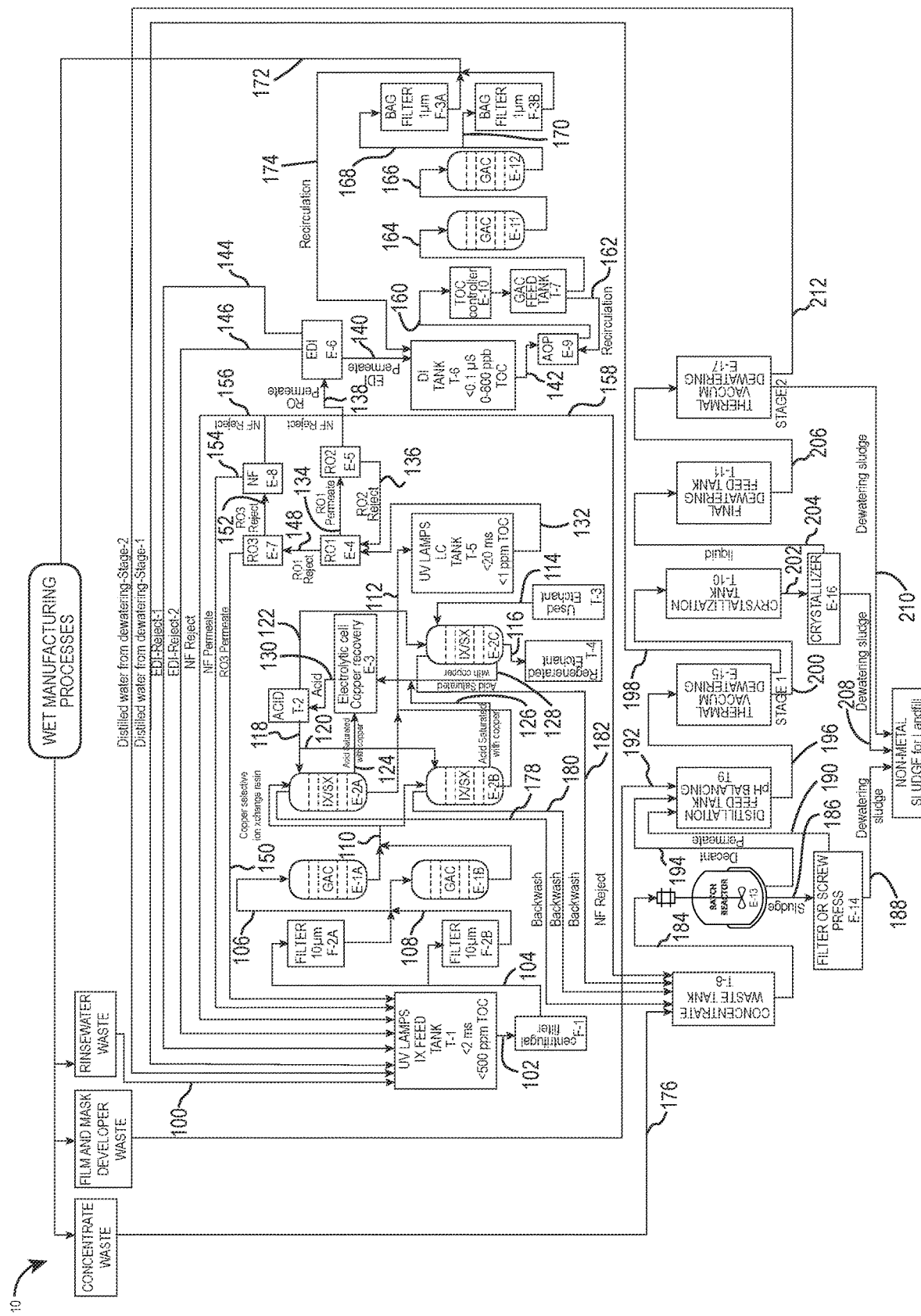

ZERO LIQUID DISCHARGE RECYCLING SYSTEM FOR PCB FAB, GENERAL METAL FINISHING, AND CHEMICAL MILLING

REFERENCE TO PRIOR APPLICATIONS

This application claims the benefit of prior application Ser. No. 17/120,124, filed Dec. 12, 2020, and incorporates by reference this prior application in its entirety.

FIELD OF THE INVENTION

Embodiments described herein in general, concern methods and systems for a zero liquid discharge recycling system. More particularly, the embodiments concern methods and systems for zero liquid discharge recycling of waste generated from manufacturing operations involving Printed Circuit Boards Fabrication (PCB FAB), General Metal Finishing (GMF), semiconductor manufacturing (SEMICON), chemical milling, and Physical Vapor Deposition (PVD) manufacturing.

BACKGROUND

Unless otherwise indicated herein, the approaches described in this section are not prior art to the claims in this application and are not admitted to be prior art by inclusion in this section.

With the increasing development across the globe, the problem of water pollution has emerged as a major public interest concern. The collective waste generated by the public and commercial industries constitutes a serious public health crisis. Between the two, industrial waste presents the greatest danger to the public's health and if disposed directly into soil or water poses a significant threat to the quality of soil and/or aquatic life. In view of this crisis and the public's increased awareness, different methodologies have been adopted to tackle these issues.

The concept of industrial waste treatment has historically faced ignorance and denials. The waste contains complex chemical compounds which require adequate treatments to neutralize or minimize the poisonous impacts of these chemicals on the environment. Municipal level sewage treatment plants have been widely adopted to treat these industrial wastes. Such treatment plants utilize bacteria which helps with the biological decomposition of the industrial waste. In addition, wastewater treatments for manufacturing operations in the above industries rely on the use of reverse osmosis and ion exchange technologies to purify city water (or other water sources) as well as to recycle dilute rinse waters. These approaches achieve a recycling level of 0-90 percent. The ion exchange regeneration chemicals and other chemical cleaning solutions are subsequently batch treated along with other concentrated water streams to remove regulated metals. In addition, further processing to remove regulated organics is required, if they exist, prior to discharging the treated materials into a sewer pipe. This approach is considered a public owned treatment works (POTW).

However, this approach has significant limitations. For example, if the discharged water exceeds drinking water contamination standards, the water requires further treatment prior to release into the environment. Finally, POTW facilities are highly regulated which can have a negative impact on the business.

It is apparent that a need exists for a better waste management system that overcomes the many above described disadvantages.

SUMMARY OF THE INVENTION

According to one embodiment, a zero liquid discharge recycling method for treating waste generated from manufacturing operations is provided. The manufacturing operations include at least one of Printed Circuit Boards Fabrication (PCB FAB), General Metal Finishing (GMF), semiconductors manufacturing, chemical milling, and Physical Vapor Deposition (PVD) manufacturing. In one embodiment, the waste includes rinse-water waste, concentrate waste, and film and mask developer waste. The zero liquid discharge recycling method includes treating the rinse-water waste in an ion exchange feed tank, a first granular activated carbon (GAC) column, a copper selective ion exchange column, a membrane-based separation module, and an advanced oxidation process (AOP) tank to generate an ultra-pure water output. In another embodiment, the method further includes treating the concentrate waste in a chemical dewatering reactor to generate a first part of a solid waste output. In another embodiment, the output of the chemical dewatering reactor and the film and mask developer waste are treated in a distillation feed tank, a thermal vacuum dewatering tank, and a crystallization tank to generate a distilled water output to be treated along with the rinse-water waste, and a second and third part of the solid waste output.

In one embodiment, treating the rinse-water waste in the ion exchange feed tank comprises feeding the rinse-water waste from the manufacturing operations into the ion exchange feed tank and exposing the rinse-water waste to ultraviolet light within the ion exchange feed tank.

In another embodiment, the suspended solids are removed from an output of the ion exchange tank using a centrifugal filter and bag filters with 10 μm meshes.

In another embodiment, treating the rinse-water waste in the first granular activated carbon (GAC) column includes feeding the output of the ion exchange feed tank, after the removal of the suspended solids, into the first granular activated carbon (GAC) column. The non-polar organic compounds, halogens, and water-insoluble substances are also removed from the output of the ion exchange feed tank.

In another embodiment, treating the rinse-water waste in the copper selective ion exchange column comprises feeding an output of the first granular activated carbon (GAC) column into the copper selective ion exchange column and binding copper ions present in the output of the first granular activated carbon (GAC) column by a copper selective ion exchanger within the copper selective ion exchange column. In another embodiment, the method further includes feeding an output of the copper selective ion exchange column into a low conductivity water tank and exposing the output of the copper selective ion exchange column to ultraviolet light within the low conductivity water tank.

In one embodiment, treating the rinse-water waste in the membrane-based separation module includes feeding an output of the low conductivity water tank into a first reverse osmosis (RO) module. The output of the low conductivity water tank is separated into an RO1 permeate and an RO1 reject within the first RO module. In another embodiment, the RO1 permeate is fed into a second RO module, and is separated into an RO2 permeate and an RO2 reject within the second RO module. The RO2 reject is circulated to the first RO module to be treated along with the output of the low conductivity water tank. In another embodiment, the RO2 permeate is fed into an electrodeionization (EDI) module. The RO2 permeate is separated into an EDI permeate and two streams of EDI reject within the EDI module. In another embodiment, the RO1 reject is fed into a third RO module. The RO1 reject is separated into RO3 permeate and RO3 reject within the third RO module. The RO3 permeate is circulated to the ion exchange feed tank. The RO3 reject is fed into nanofiltration (NF) module, which separates the RO3 reject into NF permeate and NF reject. When conductivity in the ion exchange feed tank is below a predetermined threshold the NF reject is circulated from the NF module to the ion exchange feed tank, and when the conductivity in the ion exchange feed tank exceeds the predetermined threshold the NF reject is fed from the NF module into the concentrate waste tank.

In another embodiment, treating the rinse-water waste in the advanced oxidation process (AOP) tank includes feeding the EDI permeate into the AOP tank via a deionized (DI) water tank and exposing the EDI permeate to ozone and ultraviolet light within the AOP tank. In one embodiment, the output of the AOP tank is fed to a granular activated carbon (GAC) feed tank via a total organic carbon (TOC) controller. If an amount of TOC, as measured by the TOC controller, in the output of the AOP tank exceeds a predetermined value, an output of the GAC feed tank is recirculated into the AOP tank. If the amount of TOC, as measured by the TOC controller, in the output of the AOP tank is below the predetermined value, the output of the GAC feed tank is fed into a second granular activated carbon (GAC) column. The output of the second GAC column is fed to a third GAC column. In another embodiment, the output of the third GAC column is filtered by using bag filters with 1 µm mesh to generate the ultra-pure water output.

In another embodiment, the two streams of EDI reject from the EDI module are circulated to the ion exchange feed tank. In addition, the NF permeate from the NF module is circulated to the ion exchange feed tank.

In another embodiment, the concentrate waste is treated in the chemical dewatering reactor. The method further includes feeding the concentrate waste from the manufacturing operations into a concentrate waste tank. The NF reject is also fed to the concentrate waste tank when conductivity in the ion exchange feed tank exceeds a predetermined threshold. The method further includes feeding an output of the concentrate waste tank into the chemical dewatering reactor. In another embodiment, a chemical process is performed on the output of the concentrate waste tank within the chemical dewatering reactor to generate a sludge and a decant. The sludge from the chemical dewatering reactor is fed into a filter or screw type press to generate the first part of the solid waste output, and a permeate.

In one embodiment, treating the output of the chemical dewatering reactor and the film and mask developer waste in the distillation feed tank includes feeding the film and mask developer waste from the manufacturing operations into the distillation feed tank. The method further includes feeding the decant from the chemical dewatering reactor and the permeate from the filter or screw type press into the distillation feed tank. In another embodiment, the method includes pH balancing of the pH of a mixture of the film and mask developer waste, the decant, and the permeate within the distillation feed tank.

In one embodiment, treating the output of the chemical dewatering reactor and the film and mask developer waste in the thermal vacuum dewatering tank and the crystallization tank includes feeding an output of the distillation feed tank into a first thermal vacuum dewatering tank. The output of the distillation feed tank is heated within the first thermal vacuum dewatering tank in a partial vacuum to generate a first stage distillate and a densified concentrate wherein the first stage distillate forms a first part of the distilled water output. In another embodiment, the method further includes feeding the densified concentrate from the first thermal vacuum dewatering tank to the crystallization tank. The densified concentrate is crystallized using chill water within a crystallizer of the crystallization tank to generate the second part of the solid waste output and a processed liquid. In another embodiment, the processed liquid is fed from the crystallizer into a second thermal vacuum dewatering tank via a final dewatering feed tank. The processed liquid is dewatered within the second thermal vacuum dewatering tank to generate a second stage distillate and the third part of the solid waste output, wherein the second stage distillate forms a second part of the distilled water output.

In another embodiment, the first stage distillate is circulated from the first thermal vacuum dewatering tank to the ion exchange feed tank. In addition, the second stage distillate is circulated from the second thermal vacuum dewatering tank to the ion exchange feed tank.

According to another embodiment a zero liquid discharge recycling system for treating waste generated from manufacturing operations is provided. These manufacturing operations include at least one of Printed Circuit Boards Fabrication (PCB FAB), General Metal Finishing (GMF), semiconductors manufacturing, chemical milling, and Physical Vapor Deposition (PVD) manufacturing. The waste includes rinse-water waste, concentrate waste, and film and mask developer waste. The zero liquid discharge recycling system described herein relies on the use of multiple technologies, collectively and separately, to achieve zero liquid discharge. These technologies include an ion exchange feed tank, a first granular activated carbon (GAC) column, a copper selective ion exchange column, a membrane-based separation module, and an advanced oxidation process (AOP) tank operative for treating the rinse-water waste to generate an ultra-pure water output. In addition, the system may include a chemical dewatering reactor operative for treating the concentrate waste to generate a first part of a solid waste output. The system may include a distillation feed tank, a thermal vacuum dewatering tank, and a crystallization tank for treating an output of the chemical dewatering reactor and the film and mask developer waste to generate a distilled water output that is treated with the rinse-water waste, and a second and a third part of the solid waste output.

The ion exchange feed tank includes an ultraviolet light generating lamp for exposing the rinse-water waste to ultraviolet light within the ion exchange feed tank. The system may also include a centrifugal filter and bag filters with 10 µm meshes to remove suspended solids from an output of the ion exchange feed tank.

The first granular activated carbon (GAC) column removes non-polar organic compounds, halogens, and water-insoluble substances from the output of the ion exchange feed tank after the removal of the suspended solids.

The copper selective ion exchange column includes a copper selective ion exchanger that binds copper ions present in an output of the first granular activated carbon (GAC) column.

The system further includes a low conductivity water tank to expose an output of the copper selective ion exchange column to ultraviolet light.

The membrane-based separation module comprises three reverse osmosis modules. A first reverse osmosis (RO) module is used to separate an output of the low conductivity water tank into an RO1 permeate and an RO1 reject. A second RO module is used to separate the RO1 permeate into an RO2 permeate and an RO2 reject. The first RO module is further used to separate the RO2 reject along with the output of the low conductivity water tank into the RO1 permeate and the RO1 reject. A third RO module is used to separate the RO1 reject into an RO3 permeate and an RO3 reject. An electrodeionization (EDI) module is used to separate the RO2 permeate into an EDI permeate and two streams of EDI reject. A nanofiltration (NF) module is used to separate the RO3 reject into an NF permeate and an NF reject.

The advanced oxidation process (AOP) tank is used to expose the EDI permeate to ozone and ultraviolet light, wherein the system may further include a second and a third granular activated carbon (GAC) column and bag filters with 1 μm mesh to generate ultra-pure water output. In other examples, the bag filters comprise meshes having size ranging between 0.1-10 μm.

The system may include conduits to circulate the two streams of EDI reject from the EDI module, the NF permeate from the NF module and the RO3 permeate from the third RO module to the ion exchange feed tank. The system may further include conduits to circulate the NF reject from the NF module to the ion exchange feed tank when conductivity in the ion exchange feed tank is below a predetermined threshold.

The chemical dewatering reactor is used to chemically treat the concentrate waste, a backwash from the copper selective ion exchange column and the NF reject, when conductivity in the ion exchange feed tank exceeds a predetermined threshold, to generate a sludge and a decant. The system includes a filter or screw type press used to generate the first part of the solid waste output and a permeate from the sludge.

The distillation feed tank is used to pH balance the pH of a mixture of the film and mask developer waste, the decant, and the permeate.

The thermal vacuum dewatering tank and the crystallization tank are used to heat an output of the distillation feed tank within a first thermal vacuum dewatering tank in a partial vacuum to generate a first stage distillate and a densified concentrate. The first stage distillate forms a first part of the distilled water output, crystallizing the densified concentrate using chill water within a crystallizer of the crystallization tank to generate the second part of the solid waste output and a processed liquid. The processed liquid is dewatered within a second thermal vacuum dewatering tank to generate a second stage distillate and the third part of the solid waste output. The second stage distillate forms a second part of the distilled water output.

The embodied system further includes conduits operative for circulating the first stage distillate from the first thermal vacuum dewatering tank and the second stage distillate from the second thermal vacuum dewatering tank to the ion exchange feed tank.

BRIEF DESCRIPTION OF THE DRAWINGS

FIG. 1 schematically shows an exemplary system 10 for a zero liquid discharge recycling method for treating waste generated from manufacturing operations, and a simplified illustration of liquid flow therewithin.

DETAILED DESCRIPTION OF THE INVENTION

Embodiments detailed herein are best understood by reference to the figure and descriptions set forth herein. All the aspects of the embodiments described herein will be better appreciated and understood when considered in conjunction with the following description and the accompanying figure. It should be understood, however, that the following descriptions, while indicating preferred embodiments and numerous specific details thereof, are given by way of illustration and not of limitation. Many changes and modifications may be made within the scope of the embodiments herein without departing from the spirit and scope thereof, and the embodiments herein include all such modifications.

This description is generally drawn, inter alia, to methods and systems implemented for the zero liquid discharge recycling of waste generated from manufacturing operations including Printed Circuit Boards Fabrication (PCB FAB), General Metal Finishing (GMF), semiconductors manufacturing, chemical milling, and Physical Vapor Deposition (PVD) manufacturing, the waste including rinse-water waste, concentrate waste, and film and mask developer waste.

The inventor and the description herein strive to revolutionize the concept of treating waste generated from manufacturing operations to achieve zero liquid discharge.

FIG. 1 schematically shows an exemplary system 10 for implementing a method for zero liquid discharge recycling treatment of waste generated from manufacturing operations. The manufacturing operations may include Printed Circuit Boards Fabrication (PCB FAB), General Metal Finishing (GMF), semiconductors manufacturing, chemical milling, and Physical Vapor Deposition (PVD) manufacturing. The manufacturing operations of these methods and processes generate waste which includes a rinse-water waste, concentrate waste, and a film and mask developer waste. These wastes are treated using different processes utilized by the zero liquid discharge recycling system 10 to achieve zero liquid discharge.

As shown in FIG. 1, the waste from the manufacturing operations is separated as rinse-water waste, concentrate waste, and film and mask developer waste. The rinse-water waste generated from the manufacturing operations is fed to an ion exchange feed tank T-1 via conduit 100. The ion exchange feed tank T-1 contains ultraviolet light generating lamps. The rinse-water waste is exposed to the ultraviolet light within the ion exchange feed tank T-1. The output of the ion exchange feed tank T-1 is fed to the centrifugal filter F-1 via a conduit 102. The centrifugal filter F-1 removes suspended solids from the output of the ion exchange feed tank T-1 and an output thereof is fed to bag filters F-2A and F-2B via conduit 104. The bag filters F-2A and F-2B remove the suspended solids still present in the output of the centrifugal filter F-1.

In some examples, the bag filters F-2A and F-2B include 10 μm meshes to remove the suspended solids from the output of the ion exchange feed tank. In some examples, the system 10 includes a level transmitter (not shown) in the ion exchange feed tank T-1 and pressure and flow transmitters (not shown) before and after the filters. In some examples, the pressures at this stage range between about 1-10 bar.

After removal of the suspended solids, the output of the bag filters F-2A and F-2B is fed to a granular activated carbon (GAC) column E-1A via conduit 106 and to a granular activated carbon (GAC) column E-1B via conduit 108. In some examples, the granular activated carbon (GAC) column E-1A and granular activated carbon (GAC) column E-1B are implemented as a single first granular activated carbon (GAC) column E-1A, E-1B. The granular activated carbon (GAC) columns E-1A and E-1B contain an activated carbon which absorbs impurities such as non-polar organic compounds, halogens, and other water-insoluble substances. This results in the removal of the polar organic compounds, halogens, and other water-insoluble substances from the output of the bag filters F-2A and F-2B.

In some examples, the granular activated carbon (GAC) columns E-1A and E-1B are equipped with measuring elements such as pressure gauges and multiparameter controllers to control the conductivity and pH of an output of the granular activated carbon (GAC) columns E-1A and E-1B. In some examples, the pH is maintained between the range of 3-12, the temperature of the fluid between 15-35° C., and conductivity between 0.1 MicroSiemens-5.0 MiliSiemens.

After removing the polar organic compounds, halogens, and water-insoluble substances, the output of the granular activated carbon (GAC) columns E-1A and E-1B is fed to copper selective ion exchange columns E-2A and E-2B via a conduit 110. The copper selective ion exchange columns E-2A and E-2B include a copper selective ion exchange resin or ion exchanger. The copper selective ion exchange resin within the copper selective ion exchange columns E-2A and E-2B binds the copper ions present in the output of the granular activated carbon (GAC) columns E-1A and E-1B.

In some examples, the ion exchange columns E-2A and E-2B are equipped with measuring elements such as pressure gauges and multiparameter controllers to control the conductivity and pH of the fluid. In some examples, the pH is maintained between the range of 3-12, the temperature of the fluid is between 15-35° C., and conductivity is between 0.1 MicroSiemens-5.0 MiliSiemens.

According to an embodiment, the copper is selectively removed from used etchant utilized during the manufacturing process. The used etchant is fed to a copper selective ion exchange columns E-2C via a conduit 114. The copper selective ion exchange resin within the copper selective ion exchange columns E-2C binds copper ions present in the used etchant and generates regenerated etchant. The regenerated etchant is fed to a regenerated etchant tank T-4 for re-use via a conduit 116.

Due to continuous ion exchange in the copper exchange columns E-2A, E-2B and E-2C, the ion exchange capability of the copper selective ion exchange resin within the copper selective ion exchange columns E-2A, E-2B and E-2C declines. To restore the original ion exchange capability of the copper selective ion exchange columns E-2A, E-2B and E-2C, a regeneration process is carried out. The regeneration process includes restoring the original ion exchange capacity of the ion exchange bed within the copper selective ion exchange columns E-2A, E-2B and E-2C by removing the copper ions attached during the exchange of counterions and by introducing appropriate mobile ions in their place. The regeneration process is achieved by passing a regenerating agent solution through the regenerating bed within the copper selective ion exchange columns E-2A, E-2B and E-2C. In the example illustrated in FIG. 1, the regenerating agent solution is sulfuric acid. The sulfuric acid is present in an acid tank T-2 and is added to the regenerating bed within the copper selective ion exchange columns E-2A, E-2B and E-2C via conduits 118 and 120 and 122 respectively.

The regenerating agent solution helps in restoring the ion exchange capability of the copper selective ion exchange columns E-2A, E-2B and E-2C. The copper selective ion exchange columns E-2A, E-2B and E-2C generates a sulfuric acid-copper solution as an output which is fed from the copper selective ion exchange columns E-2A, E-2B and E-2C via conduits 124, 126 and 128 respectively to an electrolytic cell E-3. The electrolytic cell E-3 functions to perform the copper recovery process on the received sulfuric acid-copper solution input. The received sulfuric acid-copper solution undergoes electrowinning to separate pure copper from the sulfuric acid-copper solution. The pure copper generated by the electrolytic cell E-3 is recycled for usage during manufacturing operations. Further, the removal of the pure copper from the sulfuric acid-copper solution results in regeneration of the sulfuric acid for subsequent regenerations. The regenerated sulfuric acid is fed to the acid tank T-2 via a conduit 130 to be used in the regeneration of the ion exchange capability of the copper selective ion exchange columns E-2A, E-2B and E-2C.

The output of the copper selective ion exchange columns E-2A and E-2B is fed to a low conductivity water tank T-5 via a conduit 112 for further treatment. The output of the copper selective ion exchange columns E-2A and E-2B is subsequently exposed to UV light within the low conductivity water tank T-5. The exposure to UV light protects the liquid in the tank from growth of bacteria, algae, and other micro-organisms. The output of the low conductivity water tank T-5 is fed to a membrane-based separation module. The membrane-based separation module comprises reverse osmosis (RO) modules E-4, E-5, and E-7, an electrodeionization (EDI) module E-6, and a nanofiltration (NF) module E-8.

The output of the low conductivity water tank T-5 is fed to the first reverse osmosis (RO1) module E-4 via a conduit 132. The first reverse osmosis (RO1) module E-4 performs reverse osmosis process on the output of the low conductivity water tank T-5. This process separates the output of the low conductivity water tank T-5 into an RO1 permeate and an RO1 reject within the first reverse osmosis (RO1) module E-4. The first reverse osmosis (RO1) module E-4 recovers about 65-85 percent of the infeed, i.e., the output of the low conductivity water tank T-5 as the RO1 permeate. The RO1 permeate is fed to the second reverse osmosis (RO2) module E-5 via a conduit 134.

The RO2 module E-5 performs reverse osmosis on the RO1 permeate to separate the RO1 permeate into an RO2 permeate and an RO2 reject within the RO2 module E-5. The RO2 module E-5 recovers about 65-85 percent of the infeed, i.e., the RO1 permeate, as the RO2 permeate. The RO2 reject is circulated back to the (RO1) module E-4 via conduit 136 and the RO2 permeate is fed into the EDI module E-6 via a conduit 138.

The RO2 permeate is separated into an EDI permeate and two streams of EDI reject within the EDI module E-6. The EDI module E-6 uses electrodeionization to increase resistivity to greater than 10 mega ohms. The EDI permeate is fed into an advanced oxidation process (AOP) tank E-9 via a conduit 140, a deionized (DI) water tank T-6 and a conduit 142. The two streams of EDI reject generated from the EDI module E-6, i.e., EDI reject 1 and EDI reject 2 are circulated back to the ion exchange feed tank T-1 via conduits 144 and 146, respectively.

The RO1 reject generated by the RO1 module E-4 is fed to third reverse osmosis module (RO3) E-7 via a conduit 148. The RO3 module E-7 performs reverse osmosis on the RO1 reject to separate the RO1 reject into an RO3 permeate and an RO3 reject within the RO3 module E-7. The RO3 permeate is circulated back to the ion exchange feed tank T-1 via conduit 150.

The RO3 reject generated by the RO3 module E-7 is fed to nanofiltration (NF) module E-8 via a conduit 152, and is separated into NF permeate and NF reject within the NF module E-8. The NF permeate is circulated back to the ion exchange feed tank T-1 via conduit 154. If the conductivity in the ion exchange feed tank T-1 is below a set value the NF reject is circulated back to the ion exchange feed tank T-1 via a conduit 156, and if the conductivity in the ion exchange feed tank T-1 is equal to or exceeds the set value the NF reject is fed to the concentrate feed tank T-8 via conduit 158 to be treated along with the concentrate waste. In some examples the set value for the conductivity in the ion exchange feed tank T-1 can be 300 µS. For instance, when the conductivity in the ion exchange feed tank T-1 is between 300-2000 µS, the system operates in a normal mode and the NF reject is fed to the concentrate feed tank T-8. When the conductivity in the ion exchange feed tank T-1 is below 300 µS, the NF reject is circulated back to the ion exchange feed tank T-1.

In some examples, the membrane-based separation modules are equipped with measuring elements such as level transmitter in the tank pressure gauges, flow transmitters, pressure transmitters and conductivity transmitters. In some examples, the pH is maintained between the range 3-12, the temperature of the fluid between 15-35° C., and conductivity between 0.03 MicroSiemens-5.0 MiliSiemens.

The EDI permeate is exposed to ozone and ultraviolet light within advanced oxidation process (AOP) tank E-9. This exposure breaks down long chain molecules which are not removed during previous stages of treatment. The output generated by the advanced oxidation process (AOP) tank E-9 is fed into a granular activated carbon (GAC) feed tank T7 via a conduit 160, which has an inline mounted total organic carbon (TOC) controller E-10. The TOC controller E-10 measures the TOC amount in the output of the advanced oxidation process (AOP) tank E-9. If the amount of TOC in the output of the AOP tank E-9 exceeds a predetermined value, the output of the GAC feed tank T-7 is recirculated to the AOP tank E-9 via a conduit 162. If the amount of TOC in the output of the AOP tank E-9 is zero or below a predetermined value, the output of the GAC feed tank T-7 is fed into a second granular activated carbon (GAC) column E-11 via a conduit 164. In some examples, the predetermined value for the TOC can be 0-2 ppm. In other examples, the predetermined value for the TOC can be 1-2 ppm. The output of the second granular activated carbon (GAC) column E-11 is fed into a third granular activated carbon (GAC) column E-12 via a conduit 166.

The second granular activated carbon (GAC) column E-11 and the third granular activated carbon (GAC) column E-12 capture small, fragmented molecules, and an output thereof is fed to bag filters F-3A and F-3B via conduits 168 and 170 respectively. The bag filters F-3A and F-3B filters the output of the third granular activated carbon (GAC) column E-12 to generate an ultra-pure water output. The ultra-pure water output is sent for re-use in the manufacturing operations via a conduit 172. Further, the residue generated by the bag filters F-3A and F-3B after filtering the output of the third granular activated carbon (GAC) column E-12 is recirculated back to the DI water tank T-6 for further treatment via conduit 174.

In some examples, the bag filters F-3A and F-3B comprise a 1 µm mesh to generate the ultra-pure water output. In other examples, the bag filters F-3A and F-3B comprise meshes having sizes ranging between 0.1-10 µm.

In some examples, the DI water tank T-6 and/or the advanced oxidation process (AOP) tank E-9 comprises measuring elements such as level transmitters in the tank, pressure gauges, pressure transmitters, conductivity transmitters and flow meters. In some examples, the resistivity of the fluid is maintained between 10-18 mega ohm and total organic carbon (TOC) is between 0-800 ppb.

As further shown in FIG. 1, the concentrated waste is treated in a chemical dewatering reactor E-13. The concentrated waste generated from the manufacturing operations is fed into a concentrate waste tank T-8 via a conduit 176. Also, a backwash from the copper selective ion exchange columns E-2A, E-2B, and E-2C is fed to the concentrate waste tank T-8 via conduits 178,180, and 182, respectively. The NF reject from the nanofiltration (NF) module E-8 is fed to the concentrate waste tank T-8 via the conduit 158. The output of the concentrate waste tank T-8 is fed into the chemical dewatering reactor E-13 via a conduit 184 for performing chemical processes on the output of the concentrate waste tank T-8. In the chemical dewatering reactor E-13, the output of the concentrate waste tank T-8 is discontinuously treated in several successive chemical treatment steps by taking into consideration the required reaction times. The chemical treatment steps are performed to adjust the pH of and to remove the total suspended solids (TSS) from the output of the concentrate waste tank T-8. The pH is adjusted to drop out solids from the output of the concentrate waste tank T-8. In some examples, the pH is adjusted by adding acid and hydroxide solutions, and/or a polymer or flocculent to help settle those solids. The chemical steps performed within the chemical dewatering reactor E-13 include processes such as, but not limited to, neutralization (adding acid and hydroxide solutions), precipitation (mixing solvents or changing their temperature), coagulation/flocculation (adding a polymer or flocculent to help settle solids), and sedimentation. These chemical processes generate a sludge and a decant within the chemical dewatering reactor E-13.

In some examples, the chemical dewatering reactor E-13 also includes a level transmitter for level controls. If the level within the chemical dewatering reactor E-13 reaches a high level, the pumps which are feeding the output of the concentrate waste tank T-8 into the chemical dewatering reactor E-13 will automatically shut off. The pumping system cannot be started until minimum low level is reached which ensures that the input which is to be treated, i.e. the output of the concentrate waste tank T-8, is enough.

In some examples, the chemical dewatering reactor E-13 comprises a level transmitter and pH and ORP (oxidation reduction potential) meters. The pH adjustment in the chemical dewatering reactor E-13 is between 8-11.

In some examples, the chemical dewatering reactor E-13 is equipped with a mixer which is used to turn on and off the timing intervals to discontinuously treat the output of the concentrate waste tank T-8 in several successive chemical treatment steps by taking into consideration the required reaction times. The different chemical processes generate the sludge and the decant within the chemical dewatering reactor E-13.

The sludge from the chemical dewatering reactor E-13 is fed into a filter or screw type press E-14 via a conduit 186 to generate a first part of the solid waste output, i.e., a dewatering sludge, and a permeate. The dewatering sludge is transported to a non-metal sludge landfill via a conduit 188.

The permeate is fed from the filter or screw type press E-14 to a distillation feed tank T-9 via a conduit 190. Also, the film and mask developer waste from the manufacturing operations and the decant from the chemical dewatering reactor E-13 are also fed into the distillation feed tank T-9 via conduits 192 and 194, respectively.

In the distillation feed tank T-9, acidic or caustic solutions are added to achieve pH balancing of the film and mask developer waste, the decant, and the permeate within the distillation feed tank T-9. In some examples, the distillation feed tank T-9 comprises measuring elements such as level transmitters and pH controllers.

The output of the distillation feed tank T-9 is fed into a first thermal vacuum dewatering tank E-15 via a conduit 196. The output of the distillation feed tank T-9 is heated up to a range of 80-95° C. within the first thermal vacuum dewatering tank E-15. This process is also coupled with a partial vacuum to accelerate the distillation of the output of the distillation feed tank T-9 within the first thermal vacuum dewatering tank E-15. In some examples, the heating of the output of the distillation feed tank T-9 is accomplished via a heat exchange coil containing hot water or steam. The heating of the output of the distillation feed tank T-9 generates a first stage distillate and a densified concentrate wherein the first stage distillate forms a first part of the distilled water output. The first part of the distilled water output is fed to the ion exchange feed tank T-1 via a conduit 198 for re-treatment along with the the rinse-water waste.

The densified concentrate from the first thermal vacuum dewatering tank E-15 is fed to a crystallization tank T-10 via a conduit 200. The densified concentrate is taken from an initial density of between 1.00-1.11 g/ml and raised until a density of 1.3-1.5 g/ml is achieved. The densified concentrate is then fed to a crystallizer E-16 via a conduit 202. The crystallizer E-16 relies on chill water to cool the solution and remove the precipitant solids as they form. The crystallizer E-16 generates a second part of the solid waste output and a processed liquid.

The processed liquid is fed from the crystallizer E-16 to a final dewatering feed tank T-11 via conduit 204 and is further fed to a second thermal vacuum dewatering tank E-17 via a conduit 206. The processed liquid is dewatered within the second thermal vacuum dewatering tank E-17 to generate a second stage distillate and a third part of the solid waste output wherein the second stage distillate forms a second part of the distilled water output. The dewatering within the second thermal vacuum dewatering tank E-17 relies on a jacketed hot water heating system and contains a rotating scraper inside to dewater the processed liquid into the third part of the solid waste output. The second part of solid waste output generated by the crystallizer E-16 and the third part of solid waste output generated by the second thermal vacuum dewatering tank E-17 are sent to the non-metal sludge for landfill via conduits 208 and 210 respectively.

The first stage distillate from the first thermal vacuum dewatering tank E-15 and the second stage distillate from the second thermal vacuum dewatering tank E-17 are circulated to the ion exchange feed tank T-1 via conduits 198 and 212 respectively. Therefore, the zero liquid discharge recycling of waste generated from manufacturing operations is achieved.

All ranges cited herein shall be considered inclusive unless otherwise indicated. Although the present description has been presented in terms of certain preferred embodiments, various features of separate embodiments can be combined to form additional embodiments not expressly described. Moreover, other embodiments apparent to those of ordinary skill in the art after reading this disclosure are also within the scope of this description. Furthermore, not all of the features, aspects and advantages are necessarily required to practice the present invention. Thus, while the above detailed description has shown, described, and pointed out novel features as applied to various embodiments, it will be understood that various omissions, substitutions, and changes in the form and details of the apparatus or process illustrated may be made by those of ordinary skill in the technology without departing from the spirit of the invention. The embodiments described above are to be considered in all respects as illustrative only and not restrictive in any manner. The scope of the invention is indicated by the following claims, informed by the above descriptions.

What is claimed is:

1. A zero liquid discharge recycling system for treating waste generated from manufacturing operations, the system comprising a plurality of modules operative to treat at least one of rinse-water waste, concentrate waste, and film and mask developer waste, and a plurality of conduits in communication with the plurality of modules to guide flow of rinse-water waste, concentrate waste, and film and mask developer waste to generate ultra-pure water, a first part of solid waste output, a second part of solid waste output, and a third part of solid waste output; wherein the plurality of modules comprise an ion exchange feed tank, a centrifugal filter, a plurality of bag filters, at least one granular activated carbon (GAC) column, a copper selective ion exchange column, a low conductivity water tank, a membrane-based separation module, an advanced oxidation process (AOP) tank, a total organic carbon (TOC) controller, a chemical dewatering reactor, a distillation feed tank, at least one thermal vacuum dewatering tank, and a crystallization tank.

2. The zero liquid discharge recycling system of claim 1, wherein the first part of solid waste output, the second part of solid waste output, and the third part of solid waste output are non-metal dewatered sludges for landfill, and ultra-pure water is reused in the manufacturing operations.

3. A zero liquid discharge recycling system comprising:
   an ion exchange feed tank operative at temperature between 15-35° C., a first granular activated carbon (GAC) column operative at temperature between 15-35° C., a copper selective ion exchange column operative at temperature between 15-35° C., a membrane-based separation module operative at temperature between 15-35° C., an advanced oxidation process (AOP) tank, a second GAC and a third GAC column, and a plurality of bag filters operative to generate ultra-pure water from the rinse water waste; and
   a chemical dewatering reactor operative to generate a first part of solid waste output, a distillation feed tank operative to balance pH by adding acidic or caustic solutions, a first thermal vacuum dewatering tank operative at temperature range of 80-95° C., a crystallization tank operative to densify the concentrate to 1.3-1.5 g/ml, a crystallizer operative to generate a second part of solid waste output, and a second thermal vacuum dewatering tank operative to generate a third part of solid waste output, wherein the system treats waste generated from manufacturing operations, and treats at least one of rinse-water waste, concentrate waste, and film and mask developer waste.

4. The zero liquid discharge recycling system of claim 3, wherein the ultra-pure water is re-used in the manufacturing operations.

5. The zero liquid discharge recycling system of claim 3, wherein pH of the output of the ion exchange feed tank, the copper selective ion exchange column, and the membrane-based separation module is maintained between 3-12.

6. The zero liquid discharge recycling system of claim 3, wherein a conductivity of the output of the ion exchange feed tank, the copper selective ion exchange column, and the membrane-based separation module is maintained between 0.03 MicroSiemens-5.0 MiliSiemens.

7. The zero liquid discharge recycling system of claim 3, wherein the membrane-based separation module comprises:
- a first reverse osmosis (RO) module for separating an output of the low conductivity water tank into an RO1 permeate and an RO1 reject;
- a second RO module for separating the RO1 permeate into an RO2 permeate and an RO2 reject, wherein the first RO module is for separating the output of the low conductivity water tank into the RO1 permeate and the RO1 reject is for separating the RO2 reject along with the output of the low conductivity water tank into the RO1 permeate and the RO1 reject;
- a third RO module for separating the RO1 reject into an RO3 permeate and an RO3 reject;
- an electrodeionization (EDI) module for separating the RO2 permeate into an EDI permeate and two streams of EDI reject; and
- a nanofiltration (NF) module for separating the RO3 reject into an NF permeate and an NF reject,
wherein the EDI permeate forms output of the membrane-based separation module.

8. The system zero liquid discharge recycling of claim 7, wherein the RO3 permeate, the EDI reject, and the NF permeate are circulated to the ion exchange feed tank.

9. The system zero liquid discharge recycling of claim 3, wherein pH in the chemical dewatering reactor is maintained between 8-11.

10. The zero liquid discharge recycling system of claim 3, wherein a first part of distilled water and a second part of distilled water generated from the first thermal vacuum dewatering tank and the second thermal vacuum dewatering tank, respectively, are circulated to the ion exchange feed tank.

11. The zero liquid discharge recycling system of claim 3, wherein the concentrate waste is fed to a concentrate waste tank, the film and mask developer waste is fed to the distillation feed tank, and the rinse water waste is fed to the ion exchange feed tank.

12. The zero liquid discharge recycling system of claim 11, wherein the concentrate waste tank receives backwash from the copper selective ion exchange column and an NF reject from the membrane-based separation module.

13. The zero liquid discharge recycling system of claim 11, wherein the chemical dewatering reactor includes a level transmitter, wherein when the level transmitter indicates a high level within the chemical dewatering reactor a concentrate waste feed from the concentrate waste tank into the chemical dewatering reactor is automatically shut off, and the concentrate waste feed is started when a minimum low level is reached in the chemical dewatering reactor, to ensure a predetermined amount of concentrate waste is fed to the chemical dewatering reactor.

14. The zero liquid discharge recycling system of claim 3, wherein the manufacturing operations comprise at least one of Printed Circuit Boards Fabrication (PCB FAB), General Metal Finishing (GMF), semiconductors manufacturing, chemical milling, and Physical Vapor Deposition (PVD) manufacturing.

15. The zero liquid discharge recycling system of claim 3, wherein the first part of solid waste output, the second part of solid waste output, and the third part of solid waste output are non-metal dewatered sludges used for landfill.

* * * * *